US008291405B2

(12) United States Patent
Buckley et al.

(10) Patent No.: US 8,291,405 B2
(45) Date of Patent: Oct. 16, 2012

(54) AUTOMATIC DEPENDENCY RESOLUTION BY IDENTIFYING SIMILAR MACHINE PROFILES

(75) Inventors: Martin John David Buckley, Sandy, UT (US); Tambet Ingo, Tartu (EE); Jose H. Mercado, Cambridge, MA (US); Carlos Enrique Montero-Luque, Cambridge, MA (US)

(73) Assignee: Novell, Inc., Provo, UT (US)

( * ) Notice: Subject to any disclaimer, the term of this patent is extended or adjusted under 35 U.S.C. 154(b) by 1208 days.

(21) Appl. No.: 11/215,096

(22) Filed: Aug. 30, 2005

(65) Prior Publication Data

US 2007/0074197 A1    Mar. 29, 2007

(51) Int. Cl.
*G06F 9/44* (2006.01)
*G06N 5/00* (2006.01)

(52) U.S. Cl. ............................. 717/170; 717/121; 706/52

(58) Field of Classification Search ........... 717/168–173
See application file for complete search history.

(56) References Cited

U.S. PATENT DOCUMENTS

| | | | |
|---|---|---|---|
| 6,117,187 A | 9/2000 | Staelin | |
| 6,154,835 A | 11/2000 | Chrabaszcz et al. | |
| 6,279,030 B1 * | 8/2001 | Britton et al. | 709/203 |
| 6,282,712 B1 * | 8/2001 | Davis et al. | 717/170 |
| 6,289,512 B1 | 9/2001 | Edwards et al. | |
| 6,314,565 B1 | 11/2001 | Kenner et al. | |
| 6,405,362 B1 | 6/2002 | Shih et al. | |
| 6,578,142 B1 | 6/2003 | Anderson et al. | |
| 6,684,397 B1 | 1/2004 | Byer et al. | |
| 6,915,174 B2 | 7/2005 | Dinges et al. | |
| 7,013,462 B2 * | 3/2006 | Zara et al. | 717/177 |
| 7,096,464 B1 * | 8/2006 | Weinmann | 717/169 |
| 7,469,827 B2 * | 12/2008 | Katragadda et al. | 235/384 |
| 7,657,499 B2 * | 2/2010 | Newman et al. | 707/999.001 |
| 2004/0236728 A1 * | 11/2004 | Newman et al. | 707/3 |
| 2008/0054072 A1 * | 3/2008 | Katragadda et al. | 235/384 |

OTHER PUBLICATIONS

Bart Jacob, Sudipto Basu, Amit Tuli, and Patricia Witten. "A First Look at Solution Installation for Autonomic Computing." Jul. 2004. IBM Redbooks. pp. 93-139.*
IBM Research Disclosure Bulletin 421139, "Automatic Laptop Reconfiguration Based on a Location", May 1, 1999.*
Bart Jacob, Sudipto Basu, Amit Tuli, and Patricia Witten. "A First Look at Solution Installation for Autonomic Computing." Jul. 2004. IBM Redbooks. Chapter 2, pp. 15-31.*
Weber, Aaron, "Rolling Out the Red Carpet for Software Management: Red Carpet EnterPrise 2.0", http://support.novell.com/techcenter/articles/nc2004_03f.html, (Mar. 1, 2004), 7 p.

* cited by examiner

*Primary Examiner* — Insun Kang
*Assistant Examiner* — Erika Kretzmer
(74) *Attorney, Agent, or Firm* — Schwegman, Lundberg & Woessner, P.A.

(57) ABSTRACT

Techniques for automatic dependency resolution are provided. A source machine and a previously successful modification for a given resource, which was modified on the source machine, are identified. Dependencies associated with the modification are identified on the source machine. One or more target machines are selected in response to having a similar profile to that of the source machine. A profile is deemed to be similar based on geographic location, category or role of a machine, and based on operating system of a machine. A profile is also deemed to be similar based on a fuzzy match between profile information. The dependencies are automatically resolved on the target machines and the modification is automatically processed on the target machines to modify the given resource.

12 Claims, 3 Drawing Sheets

AUTOMATIC DEPENDENCY RESOLUTION BY IDENTIFYING SIMILAR MACHINE PROFILES

FIELD

The invention relates generally to network administration and more particularly to automatic dependency resolution for modification of a resource.

BACKGROUND

Network management has been automated over the years. Still, each machine within a network configuration can acquire its own unique state and its own unique configuration based on usage patterns of its users and resources installed. Therefore, what would seem to be fairly simple and fairly automated tasks of installing or modifying new pieces of software actually becomes an extremely manual process for each individual machine of a network configuration.

This is so, because a software modification may rely on certain other modules or configurations before an automated script can successfully modify the desired software on a given machine. If machines have different versions of dependent modules or lack dependent modules altogether, then an automated script to modify the desired software will likely fail. Moreover, trying to account for all potential scenarios and dependencies within a given installation or modification script are often infeasible and impractical tasks.

Furthermore, a modification may appear on the surface to be successful for a given machine, when in fact the modification is later determined to be problematic because certain dependencies were missing or unresolved during the initial modification. Correspondingly, it is generally believed that a full dependency analysis for each machine that is targeted for a modification has to be processed. This may entail manual examination, which can also be time and resource intensive. Also, once a successful modification is achieved or noted that modification is often not saved or reused, since it is believed to be only applicable to a particular machine of the network. Therefore, the dependency analysis and the modification work are often not repeatable tasks.

SUMMARY

In various embodiments, automatic dependency resolution techniques are provided for networked machines. More particularly and in an embodiment, one or more dependencies associated with a previously successful modification of a resource on a first machine are determined. Next, one or more second machines are identified. The one or more second machines have similar profiles to a profile of the first machine. The one or more dependencies are then resolved or verified on the one or more second machines. The previously successful modification is then automatically processed on the one or more second machines to modify the resource on the one or more second machines.

DETAILED DESCRIPTION

A "service" includes a component or combinations of components, applications, or combinations of application that act as a system. A resource includes a service and may also include a device or machine (e.g., printer, computer, intelligent apparel, intelligent appliance, phone, laptop, personal digital assistant (PDA) tablet personal computer (PC), network switch, hub, bridge, router, etc.). A resource may also include a user of a device or machine, a directory, or a data store (e.g., database, electronic file, data warehouse, etc.).

A "personality profile" or "profile" refers to a configuration and/or state of a resource, such as a machine. The personality profile may be represented in a normalized data language or format in manners similar to the events and policies. The information that may be included within a personality profile may include, but is not limited to, hardware settings, resource identifiers, calendar day, time of day, resource usage and/or load, directory structure, hardware configurations, resource configurations, hardware profile (e.g., processor speed, size of random access memory (RAM), size of storage devices, etc.), internet cache, cache content, register content, protocol capabilities and/or settings, peripheral device settings, resource licenses, etc. A personality profile of a resource may have portions that remain relatively static and other portions that are in continuous flux based on a given snapshot of a state for the resource.

As used herein the term "modification" refers to an act of installing, updating, or removing a resource. Thus, "modification" and its morphological variations are intended to include and be used synonymously with the terms "installation," "updating," and "removing," and their corresponding morphological variations.

Various embodiments of this invention can be implemented in existing resource or machine architectures as enhancements via network services. For example, in some embodiments, the techniques presented herein are implemented in whole or in part in the ZENworks® product, distributed by Novell®, Inc., of Provo, Utah. That is, in some embodiments, ZENworks® may be used to deploy novel services to resources within a network that facilitate the automatic dependency resolution and management described herein and below.

Of course, the embodiments of the invention can be implemented in a variety of architectural platforms, operating and server systems, or applications. Any particular architectural layout or implementation presented herein is provided for purposes of illustration and comprehension only and is not intended to limit embodiments of the invention.

Figure 1:
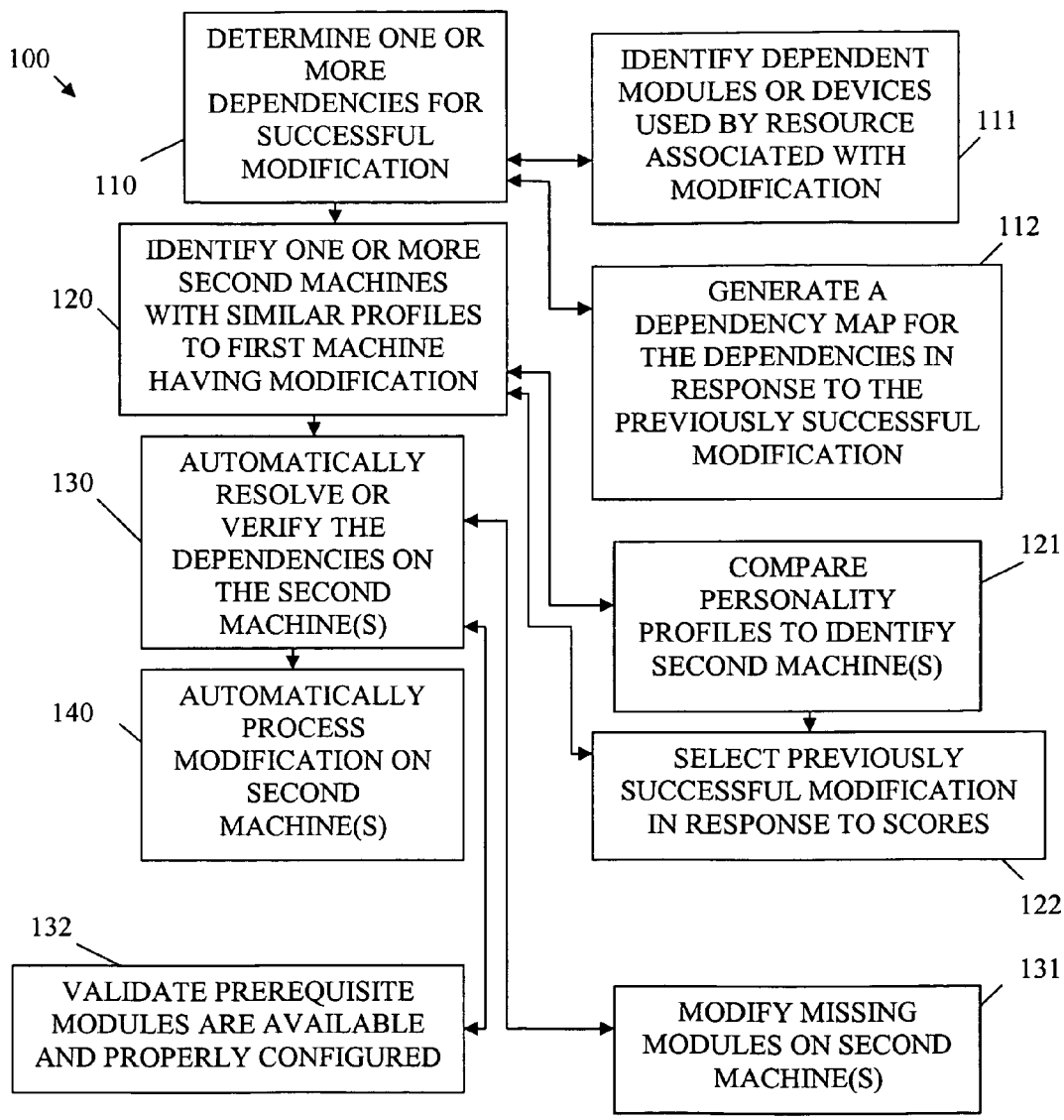
FIG. 1 is a diagram of a method for automatic dependency resolution, according to an example embodiment.

FIG. 1 is a diagram of a method 100 FIG. for automatic dependency resolution, according to an example embodiment. The method 100 (hereinafter "dependency resolving service") is implemented in a machine-readable medium. In an embodiment, the dependency resolving service is implemented on a machine and is capable of identifying an optimal modification, resolving dependencies on target machines, and automatically processing the modification on the target machines. What is deemed to be optimal may be achieved via a scoring mechanism that assigns scores to modification processes; a higher score is therefore deemed to be more optimal.

Initially, the dependency resolving service may process on a server or remote machine from client machines and is adapted to access and execute operations on the client machines over a network. The network and communication between the dependency resolving service and the client machines may be wired, wireless, or a combination of wired and wireless.

At 110, the dependency resolving service determines one or more dependencies associated with an identified previously successful modification of a resource. The success is determined because the modification has already processed at least one for purposes of modifying the resource on an initial or first machine. The modification itself may be a script or an executable program designed to modify the resource on a target machine (a machine may be viewed as another type of resource).

For example, consider an applet or script (installation) that installs a Mozilla Firefox® World-Wide Web (WWW) browser (resource) on a target machine. The installation may necessitate that a new security library (another dependent resource) be installed on the target machine. The installation may also identify that another component (yet another dependent resource) has to be updated or upgraded to install the new browser resource and may determine that still another component (still another dependent resource) has to be removed before the new browser resource can be installed on the target machine.

In an embodiment, at 111, the dependent modules or devices (dependent resources) of the modification are identified by the dependency resolving service. Thus, in the prior example for the browser resource, the dependency resolving service inspects the installation and identifies the security library, the component that has to be upgraded, and the component that has to be removed as dependent modules of the installation.

According to an embodiment, at 112, the dependency resolving service may also generate a dependency map for the dependencies associated with the modification. It should also be noted that the identified modification is recognized as a previously successful modification. That is, the modification has successfully processed on a machine to install the resource when inspected and processed by the dependency resolving service. In this manner, the dependency resolving service knows that the modification is one that has worked to modify the resource at least on one previous and first machine.

At 120, the dependency resolving service identifies one or more second machines, which have similar profiles to a first machine that has already successfully processed the modification to modify the resource. The profiles may be deemed similar based on similar configurations and resources modified on both the first machine and the one or more second machines. Alternatively, the profiles may be deemed similar in response to similar categories or roles associated with the machines, in response to similar geographical locations associated with the machines, in response to similar operation systems modified on the machines, etc.

In some embodiments, at 121, a comparison is used to achieve a similarity match between the profile of the first machine and the profiles of the one or more second machines. That is, the comparison does not have to be a binary match or a match based on category association between the machines; rather, the comparison may implement a more complex and fuzzy match having weights or scores and if a weight or score exceeds a predefined threshold, then a similarity is deemed achieved between the machines.

In a similar manner and in still more embodiments, at 122, the dependency resolving service may actually select the previously successful modification in response to a score that was associated with it. That is, the previously successful modification is deemed optimal over other modifications for a resource based on a score assigned to the modification. For example, it is not unusual to have multiple potential paths or actions to successfully install a resource within an installation script. These paths are identified via analysis and can be scored, such that an optimal path achieves a higher score than other non-optimal paths.

At 130, the dependency resolving service is enabled to automatically resolve or verify the dependencies of the one or more second machines, which have similar and favorable profiles to that of the first machine. Thus, the dependency resolving service may access operations, interfaces, or services on the one or more second machines to check for resolution of dependencies, which are used with the modification.

In some cases, at 131, the dependency resolving service may be enabled to automatically initiate operations, services, and/or interfaces on the one or more second machines for purposes of installing missing dependent modules, removing modules, or updating dependent modules. Thus, the dependency resolving service may, in some cases, automatically establish a baseline environment that is expected by the modification on each of the one or more second machines.

Similarly and in another embodiment, at 132, the dependency resolving service may validate prerequisite modules are available and properly configured on each of the one or more second machines. The dependency resolving service is enabled to ensure that dependencies are resolved and/or verified on the one or more second machines in response to the dependency resolving service's evaluation of the modification and current environments of the one or more second machines.

Finally, at 140, the dependency resolving service automatically processes the previously successful modification on the one or more second machines. This modifies the desired resource in a manner that was previously successful on the first machine. The success of the modification is reasonably assured because the one or more second machines have similar and favorable profiles to that of the first machine and the first machine successfully processed the modification to modify the resource. Moreover, in some cases, the dependency resolving service is enabled to automatically resolve and verify that dependencies are accounted for before the modification is actually processed on the one or more second machines.

It is now understood how network administration can be improved for purposes of resource modification. The dependency resolving service identifies optimal modifications and then groups machines into similar profiles. Dependencies associated with the modifications are identified and resolved and the modification is automatically processed on the machines having similar profiles to a machine that successfully processed the optimal modification. This can alleviate the manual install process that conventionally is used with network administration for new or upgraded resources.

Figure 2:
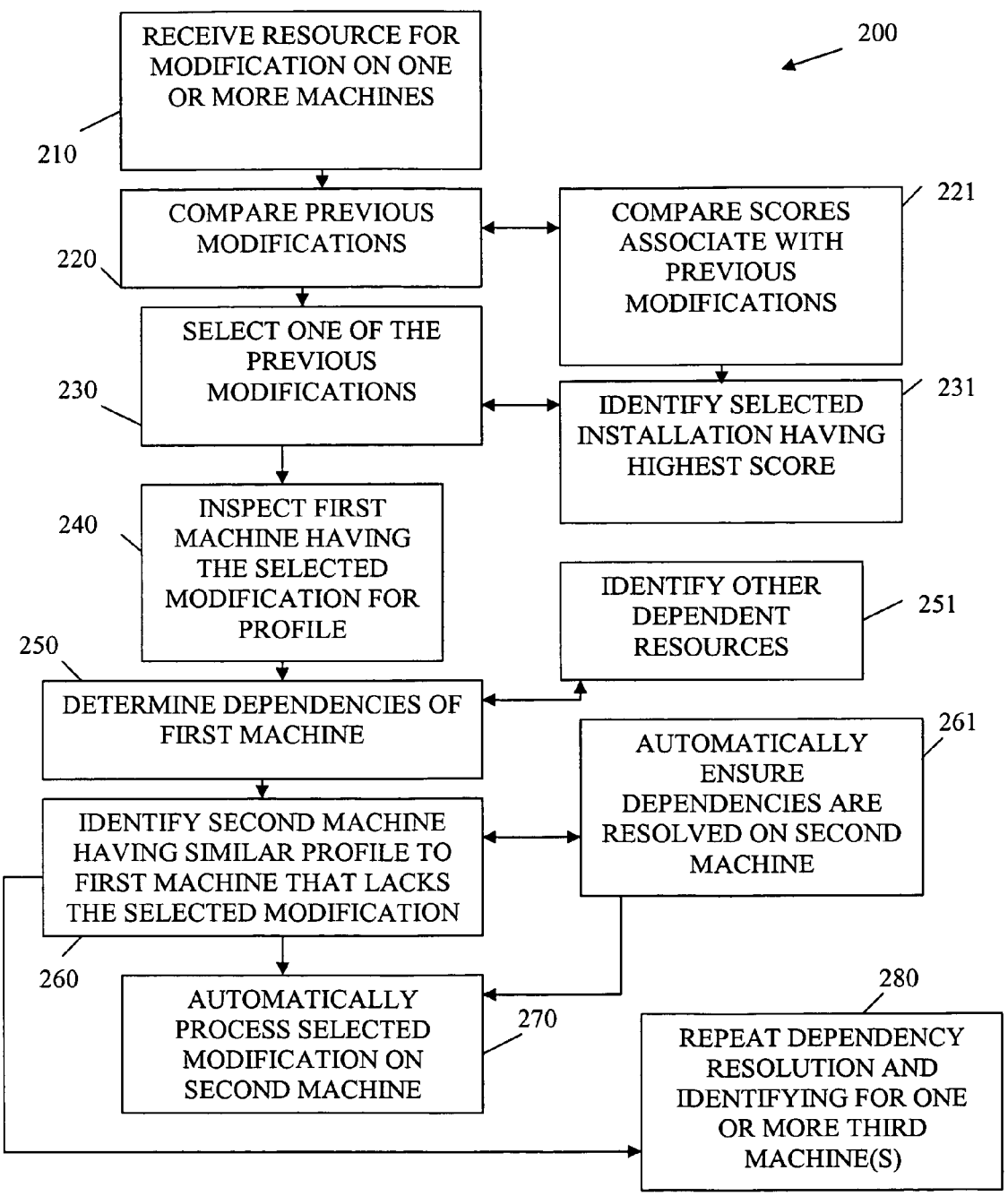
FIG. 2 is a diagram of another method for automatic dependency resolution, according to an example embodiment.

FIG. 2 is a diagram of another method 200 for automatic dependency resolution, according to an example embodiment. The method 200 (herein after "modification service") is implemented in a computer-readable medium and is operational over a network. The modification service provides an alternative view of the method 100 of FIG. 1.

The modification service processes on a machine, such as a server over a network and communicates with networked machines. Moreover, the modification service is enabled to remotely access services, operations, and/or interfaces on the networked machines for purposes of evaluating the environments of the networked machines and initiating modifications to modify desired resources on the networked machines.

Some remote access operations may also remove or install dependent resources on the networked machines.

At 210, the modification service receives an identifier for a resource that is desired to be modified on one or more machines over the network. Receipt of the identifier may occur via a network administration interface that is in communication with the modification service. Receipt may be received dynamically by a network administrator using the administration interface or may be received dynamically from other services that are designed to initiate processing with the modification service upon the occurrence of an event or at a predefined time.

At 220, the modification service compares modifications associated with modifying the resource from a library, directory, or data store that includes a plurality of modifications for the resource and identifiers to other machines that used a particular modification to install the desired resource. That is, the resource has already been modified at least once successfully on at least one other networked machine. The modification service compares the previous modification for purposes of identifying an optimal modification for the desired resource and a machine that used the optimal modification to previously successfully modify the resource.

In an embodiment, at 221, the modification service may compare scores of multiple available previous modifications or multiple available modification paths associated with a particular modification. The details of this approach were discussed above with the method 100 of FIG. 1.

At 230, the modification service selects one of the previous modifications or previous modifications paths for modifying the resource across the network on additional network machines. The selected modification is also associated with a networked machine that used the selected modification successfully to modify the desired resource.

In an embodiment, at 231, the modification service may be configured to select a particular modification in response to scores associated with the previous modifications or previous modification paths. A highest score associated with a particular modification is deemed most optimal.

At 240, the modification service inspects a first machine associated with the selected modification for its current profile. The inspection may be complex and based on state, configurations, etc. Alternatively, the inspection may be based on assigned roles, categories, or defined geographical locations associated with the first machine. In some cases, inspection may be based on a complex scenario and a role, category, or location assignment associated with the first machine.

Once the selected modification is known and the profile of the first machine that has successfully processed the modification is known, at 240, the modification service determines the dependencies associated with the selected modification as those dependencies related to the first machine. This can be done by inspecting the selected modification and inspecting the profile of the first machine or other environmental settings or configurations of the first machine.

In some cases, at 251, this may mean that the modification service identifies one or more other dependent resources that are used with the selected modification. For example, some application programming interfaces or dynamically linked libraries may have to pre-exist within a machine's environment before modification of the desired resource will take. Dependencies may also relate to a version of a particular module or dependent resource or may relate to a situation in which a particular module or resource cannot be present for the modification of the desired resource to successfully take.

At 260, the modification service identifies a second machine having a similar profile to that of the first machine and that lacks the selected modification. This identification process may occur dynamically by querying machines to obtain current profiles or it may occur by accessing information associated with networked machines to acquire roles, locations, categories, or retained profiles. Moreover, the identification of the second machine does not have to be a binary match to the profile of the first machine; rather, in some embodiments, a more fuzzy comparison may be made to a profile of the second machine based on scores or weights associated with the second machine's profile and the first machine's profile.

Once the second machine is identified as having a similar profile to that of the first machine and in an embodiment, at 261, the modification service may be enabled to automatically access operations, services, and/or interfaces on a second machine for purposes of ensuring the identified dependencies are accounted for or are resolved before the selected modification is processed on the second machine.

After the selected modification is known and the identity of the second machine is known, and optionally dependencies on the second machine are resolved and verified, at 270, the modification service automatically and dynamically in real time processes the selected modification on the second machine. This will result in an automatic modification of the desired resource on the second machine and success is reasonably assured since dependencies were resolved and since the second machine has a similar and favorable profile to that of the first machine and the first machine successfully processed the selected modification.

In an embodiment, at 280, the dependency resolution and the machine identification processing may be dynamically repeated in real time for any desired number of iterations, such that additional third machines are identified with similar profiles and may have the desired resource automatically modified by automatically processing the selected modification.

In this manner, network administration associated with modification of a desired resource is automated. Automation occurs by identifying similar machines to a machine known to have successfully processed a selected modification and by automatically verifying and resolving any dependencies on those similar machines in advance of processing the selected modification. This technique provides automated and improved assurances that resource modification can be automated over a network by the modification service identified as the method 200 of FIG. 2.

Figure 3:
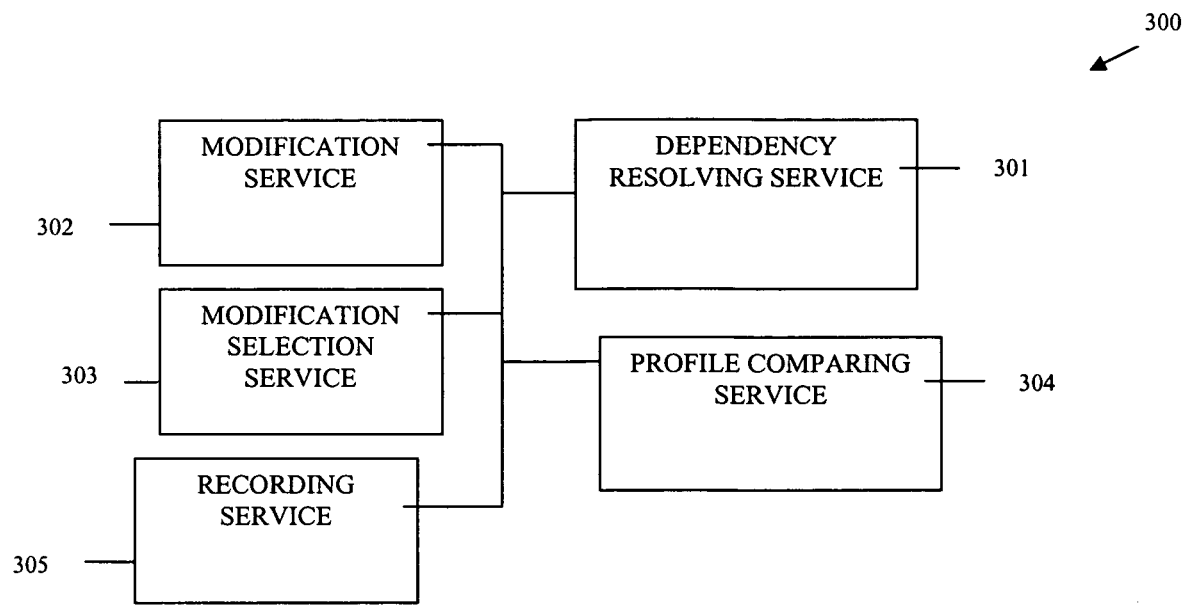
FIG. 3 is a diagram of an automatic dependency resolution system, according to an example embodiment.

FIG. 3 is a diagram of an automatic dependency resolution system 300, according to an example embodiment. The automatic dependency resolution system 300 is implemented in a computer readable medium. In an embodiment, the automatic dependency resolution system 300 implements, among other things, the methods 100 and 200 of FIGS. 1 and 2, respectively.

The automatic dependency resolution system 300 is implemented on a machine over a network. The machine is enabled to perform network administration on other networked machines, such that the automatic dependency resolution system 300 may inspect and initiate operations remotely over the network from its machine to the other networked machines. Moreover, the network may be wired, wireless, or a combination of wired and wireless.

The automatic dependency resolution system 300 includes a dependency resolving service 301 and a modification service 302. In some embodiments, the automatic dependency resolution system 300 may also include a modification selection service 303, a profile comparing service 304, and/or a recording service 305. Each of these will now be discussed in turn.

The dependency resolving service 301 is enabled during its operation to identify dependencies associated with a modification and associated with environments of networked machines. A dependency may identify a resource, a version or a resource, or may identify a resource that should not be within a given machine environment for a particular modification to take on that machine. The dependency resolving service 301 interacts with the modification service 302. Furthermore, the dependency resolving service 301 may be enabled to access machines over the network to inspect their environments for dependencies or to dynamically resolve dependencies in their environments. Thus, in some embodiments, the dependency resolving service 301 may automatically install, update, or remove dependencies from target machines over the network.

The modification service 302 is enabled during its operation to process a given modification automatically on target machines once dependencies resolved by the dependency resolving service 301. In some embodiments, the modification service may also identify an optimal modification and identify the target machines in response to a profile associated with a source machine that previously and successfully processed the optimal modification and in response to profiles associated with the target machines.

Thus, the modification service 302 cooperates with the dependency resolving service 301 for purposes of identifying a given modification, identifying target machines, identifying a source machine, resolving dependencies on the target machines, and automatically processing the given modification on the target machines to modify a desired resource associated with the given modification on those target machines. The techniques for achieving this cooperation were discussed above with the methods 100 and 200 of FIGS. 1 and 2, respectively, and are incorporated by reference herein with the discussion of the automatic dependency resolution system 300 and FIG. 3. Further, the tasks associated with the cooperation may be delegated to different system components, these components are discussed herein and below.

In an embodiment, the automatic dependency resolution system 300 may include a modification selection service 303. The modification selection service 303 is enabled during its operation to identify a given modification for processing by the modification service 302. The given modification is one that was previously and successfully processed on a first or source machine for purposes of modifying a resource. In some cases, the given modification is selected based on its score relative to other available modifications or modification paths for the desired resource. Some techniques and schemes for achieving this were discussed above with the methods 100 and 200 of FIGS. 1 and 2, respectively.

In yet another embodiment, the automatic dependency resolution system 300 may also include a profile comparing service 304. The profile comparing service 304 interacts with the modification service 302 and, optionally, any available modification selection service 303. The profile comparing service 304 compares and acquires a first profile for the source machine that previously and successfully used the given modification to modify the desired resource against one or more profiles associated with the target machines. The comparison may be a binary association based on classification or location of the source and target machines, may be a complex comparison based on profile weights or scores, or may be a combination of both a binary and complex technique. The profile comparing service 304 identifies the target machines that are to receive the desired resource by processing of the given modification.

According to an embodiment, the automatic dependency resolution system 300 may also include a recording service 305. The recording service 305 is enabled during its operation to store a given modification, to store dependencies associated with that given modification, and to store a profile associated with a source machine that previously and successfully processed the given modification. This information may be indexed in a data store or available directly from the recording service 305 and made available to the modification service 302 and the dependency resolving service 301 via queries or other application programming interfaces. The recording service 305 permits knowledge about machines and modifications to be readily retained and reused as desired.

The automatic dependency resolution system 300 permits network administration techniques associated with modifying resources over a network to be automated and optimized. It does this by identifying successful modifications for resources, identifying similar situated machines, resolving dependencies on those machines, and automatically processing the modifications. Moreover, the knowledge associated with the techniques is retainable and reusable.

Figure 4:
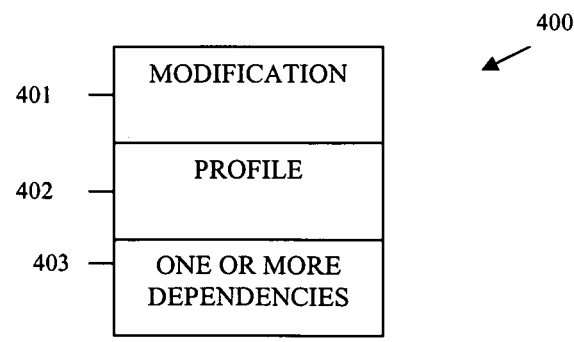
FIG. 4 is a diagram of data structure processed within a machine for automatic dependency resolution, according to an example embodiment.

FIG. 4 is a diagram of data structure 400 processed within a machine for automatic dependency resolution, according to an example embodiment. The data structure 400 is designed to be processed within a machine by one or more services for purposes of automating dependency resolution associated with modification of resources. In an embodiment, the data structure 400 is consumed by the methods 100 and 200 of FIGS. 1 and 2, respectively, and by the system 300 of FIG. 3.

The data structure 400 includes a modification 401, a profile 402, and one or more dependencies 403 associated with the modification 401. The data structure 400 is associated with the identifier of a given machine. Each of these and the manner in which they are processed will now be discussed in turn.

The modification 401 may be a script or an extensible markup language (XML) construct that is processed by other services for purposes of modifying a desired resource. The modification 401 may be represented within the data structure as an identifier; other services may use the identifier to acquire the source associated with the modification 401.

The profile 402 is data or an identifier for a file associated with a source machine that previously successfully processed the modification 401 to modify a desired resource. The profile 402 may be one or more categories, locations, or roles associated with the source machine, may be complex environmental state or resource configurations, or may be a combination of both.

The one or more dependencies 403 are data associated with resources or versions of other resources that should or should not be present for the modification 401. The dependencies 403 may be represented in XML or may be represented by identifiers to standard dependencies 403 stored in a data store. Alternatively, the full text of the dependencies 403 may be included in the data structure 400.

In an embodiment, the data structure 400 may be indexed and stored in a data store or directory, such that each unique instance of the data structure 400 represents a package of information for a given resource and a given source machine. This permits the data structure 400 to be acquired and processed for purposes of facilitating automatic modification of a desired resource on multiple target machines that have a similar or favorable profile 402 of the source machine.

The data structure 400 captures knowledge about network administration associated with modification of resources and organizes it in a favorable fashion that is more conducive to processing by the methods 100 and 200 of FIGS. 1 and 2, respectively, and by the system 300 of FIG. 3. The data structure 400 may be written to and read, and facilitates the processing of the modification 401 on a machine.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   determining one or more dependencies associated with a previously successful modification of a resource on a first machine;
   identifying one or more second machines having a similar profile to the first machine, a particular profile is deemed to be the similar profile by comparing geographical locations, categories, or roles assigned to the first machine with the one or more second machines, and by comparing operating systems for the first machine with the one or more second machines, wherein the comparing is performed using a fuzzy match between a first machine profile vis-à-vis second machine profiles of the one or more second machines computing weights and scores for comparison with a predefined threshold to deem the similar profile, the first profile and the second profile include information for the first machine and the second machine identifying: cache content, hardware settings, resource identifiers, calendar day, time of day, resource usage and load, directory structure, hardware configurations, resource configurations, processor speed, size of random access memory, size of storage devices, Internet cache, register content, protocol capabilities, peripheral device settings, and resource licenses, the first machine profile and the second machine profiles represented in a normalized data format for comparisons;
   automatically resolving or verifying the one or more dependencies on the one or more second machines by automatically accessing operations, interfaces, and services on the one or more second machines to check for resolutions of the one or more dependencies; and
   automatically processing the previously successful modification for the resource on the one or more second machines, the previously successful modification executed as a script on the one or more second machines.

2. The method of claim 1, wherein determining further includes identifying dependent software modules or dependent devices used by the resource on the first machine.

3. The method of claim 1, wherein identifying further includes identifying a particular profile as having portions that remain static and other portions that are in continuous flux based on a given snapshot of a state for the resource.

4. The method of claim 1, wherein automatically resolving or verifying further includes modifying a number of missing modules on the one or more second machines, wherein the missing modules are prerequisites to modifying the resource.

5. The method of claim 1, wherein automatically resolving or verifying further includes validating that a number of prerequisite modules used by the resource are available and properly configured on the one or more second machines.

6. The method of claim 1 further comprising, generating a dependency map for the one or more dependencies in response to the previously successful modification of the resource.

7. The method of claim 1 further comprising, selecting the previous successful modification of the resource in response to scores associated with one or more other modifications, wherein a highest score is associated with the previous successful modification.

8. A system implemented in a machine, comprising:
   a machine having memory and a processor, the memory configured with a dependency resolving service that executes on the machine implemented in a machine-readable medium and to execute on the machine; and
   the memory also configured with a modification service that executes in a machine-readable medium to execute on the machine, wherein the dependency resolving service ensures dependencies associated with a given modification of a service are resolved on target machines by automatically accessing operations, interfaces, and services on the target machines to check for resolution of the dependencies, the target machines identified by performing fuzzy matching on a first profile of a source machine against second profiles associated with the target machines, the fuzzy matching performed by computing weights and scores for the first profile and the second profiles dynamically obtained by querying the source machine and the target machines for comparison with a predefined threshold to identify matching profiles, the matching based on geographical location, categories or roles of the source machine in relation to the target machines and based on an operating system of the first machine in relation to other operating systems for the target machines, and the modification service automatically processes the given modification on the target machines once the dependencies are resolved on the given machines by the dependency resolving service, the first profile and the second profile includes information for the source machine and the target machines, the information includes: protocol capabilities, peripheral device settings, hardware settings, resource identifiers, calendar day, time of day, resource usage and load, directory structure, hardware configurations, processor speed, size of random access memory, size of storage devices, Internet cache, cache content, register content, and resource licenses, the given modification processed as a script on the target machines, the first profile and the second profile represented in a normalized data format for comparisons.

9. The system of claim 8 further comprising, a modification selection service implemented in a machine-readable medium and to execute on the machine and further to identify the given installation as a desired modification, which was previously successfully modified on the source machine.

10. The system of claim 8, wherein the dependency resolving service automatically acquires and modifies resources on the target machines in advance of the modification being processed by the modification service on the target machines.

11. The system of claim 8 further comprising, a recording service implemented in a machine-readable medium and to execute on the machine and further that stores and records the modification, the dependencies, and a profile associated with a source machine that processed the modification successfully.

12. The system of claim 8, wherein the first profile has portions that remain static and other portions that are in continuous flux based on a given snapshot of a state for the resource.

* * * * *